United States Patent
Luciano et al.

(10) Patent No.: US 7,898,678 B2
(45) Date of Patent: Mar. 1, 2011

(54) PHOTOPRINTER CONTROL OF PERIPHERAL DEVICES

(75) Inventors: Joseph W. Luciano, Lexington, KY (US); Timothy J Rademacher, Lexington, KY (US); William H Reed, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1815 days.

(21) Appl. No.: 10/932,867

(22) Filed: Sep. 2, 2004

(65) Prior Publication Data

US 2005/0024499 A1 Feb. 3, 2005

Related U.S. Application Data

(63) Continuation of application No. 09/609,891, filed on Jul. 5, 2000, now Pat. No. 6,912,060.

(51) Int. Cl.
*G06F 3/12* (2006.01)
*G06K 15/00* (2006.01)

(52) U.S. Cl. ..................... 358/1.15; 358/1.1

(58) Field of Classification Search .................. 358/1.1, 358/1.9, 1.13, 1.15, 1.18, 302; 396/7, 20, 396/25; 348/207.1, 552; 355/18, 40; 345/723
See application file for complete search history.

(56) References Cited

U.S. PATENT DOCUMENTS

| | | | |
|---|---|---|---|
| 6,000,864 A * | 12/1999 | Hanada | 400/62 |
| 6,504,960 B2 * | 1/2003 | Takahashi | 382/305 |
| 6,526,516 B1 * | 2/2003 | Ishikawa et al. | 713/340 |
| 6,529,522 B1 * | 3/2003 | Ito et al. | 370/466 |
| 6,806,978 B1 * | 10/2004 | Tamura et al. | 358/1.15 |

* cited by examiner

*Primary Examiner*—Gabriel I Garcia

(57) ABSTRACT

A photoprinter configuration comprising a digital camera having a viewable display and one or more selection mechanisms. A photoprinter is connected to the digital camera via a communication link, wherein the photoprinter is operative to control the viewable display of the digital camera. Preferably, the photoprinter is further operative to direct the results from a user's inputs to the selection mechanisms of the digital camera. The photoprinter is operable as a client to a host computer, as a host for the digital camera, and a passthrough device such that the host computer may initiate requests to the digital camera.

9 Claims, 4 Drawing Sheets

PHOTOPRINTER CONTROL OF PERIPHERAL DEVICES

RELATED APPLICATIONS

The present application is a Continuation of U.S. application Ser. No. 09/609,891 filed Jul. 5, 2000 now U.S. Pat. No. 6,912,060. The entire disclosure of which is hereby incorporated by reference.

TECHNICAL FIELD

This invention relates to the field of printer apparatuses and methods for using the same, and will be specifically disclosed in the context of stand-alone printers adapted to print digital photographs.

BACKGROUND OF THE INVENTION

The advent of computers have fundamentally changed the way images can be stored, manipulated, and printed. Images can now be captured by digital devices, such as digital cameras and scanners, and stored digitally. A digitally stored image can then be transmitted, enhanced, and manipulated through computer programs. Moreover, as digital technology has improved and associated costs fallen, the resolution of the images captured by these devices continues to improve, and in many cases approaches or exceeds the quality of traditional film photography.

Traditionally, to use a digital image one needed a computer. The computer would be loaded with a variety of different programs to transit, enhance and manipulate the digital images. To obtain a hard copy of the digital image, the user would direct the computer with an appropriate series of commands to send a "print job" from the computer to a traditional printer. While the traditional model works, it does have attendant shortcomings, such as being expensive, complicated, non-portable, etc. To combat such shortcomings, various manufacturers began offering stand-alone printers designed to print digital images. One example of a stand-alone printer is disclosed in U.S. patent application Ser. No. 09/164,500, filed on Oct. 1, 1998 assigned to the same assignee hereunder. While stand-alone printers have proven to have remarkable benefits over the traditional model, the present invention offers even more benefits and improvements for stand-alone printers.

SUMMARY OF THE INVENTION

Accordingly, an object of the invention is to provide an improved stand-alone printer. Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the present invention is a photoprinter configuration. A digital camera comprises a viewable display, such as an LCD, and one or more selection mechanisms, such as buttons or other directional inputs. A photoprinter is connected to the digital camera via communications link, such as a universal serial bus "USB". The photoprinter is operative to control the viewable display of the digital camera. Preferably, the photoprinter is further operative to direct the results from a user's inputs to the selection mechanisms.

Another aspect of the present invention is a method for controlling a digital camera. A photoprinter is obtained and is operative to print digital photographs onto printable media. A digital camera is obtained comprising a viewable display and one or more selection mechanisms. The digital camera is connected to the photoprinter via a communication link. A plurality of instructions are transmitted via the communication link to the digital camera from the photoprinter. The digital camera is controlled by the photoprinter in accordance with the plurality of instructions.

Yet another aspect of the present invention is a printer configuration comprising a host computer, a peripheral device, and a stand alone printer. The stand alone printer is connected to the host computer and peripheral device via a communication link, such as USB. The stand alone printer is operable as a client to the host computer, as a host for the peripheral device, and as a passthrough device such that the host computer may initiate requests to the peripheral device.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

Figure 1:
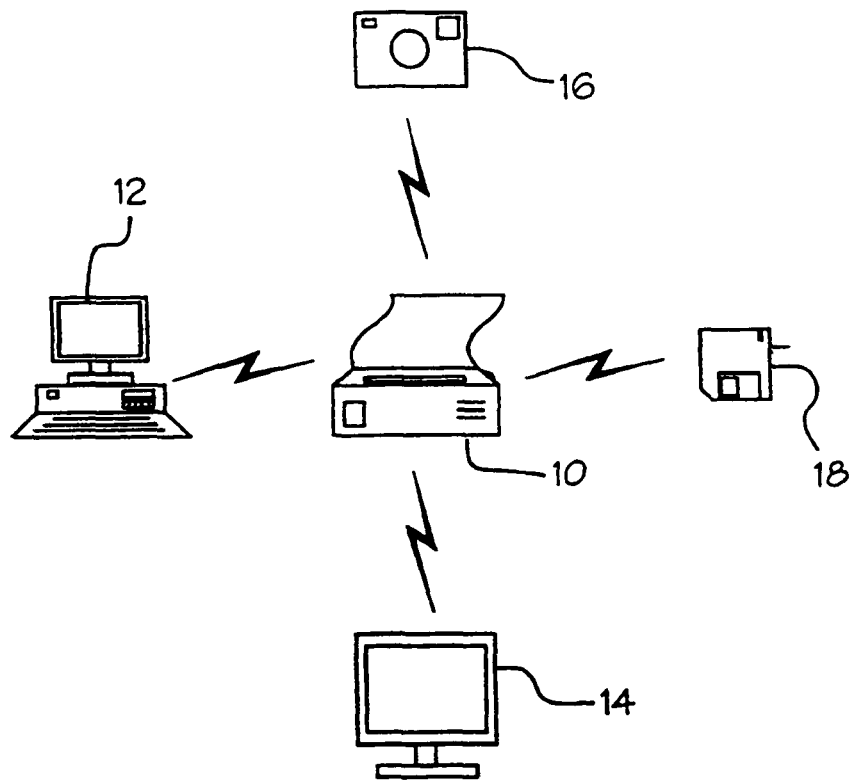
FIG. 1 depicts a photoprinter communicating with a variety of external components.

Reference will now be made to the present preferred embodiment of the invention, an example of which is illustrated in the accompanying drawings, wherein like numerals indicate the same element throughout the views. FIG. 1 illustrates one embodiment of a photoprinter 10. As used herein, a "photoprinter" refers to a stand-alone appliance for printing digital photographs onto a printable medium. A "digital photograph" is a photographic image captured by a light sensing electronic device (e.g., CCD, CMOS, CID, or the like) and converted into a digital file capable of being stored on a computer readable media. The term "stand-alone" means that the printer is capable of processing and printing digital files independent of external host device, such as a computer, wherein "processing" means calculating a pixel pattern to be printed on the printable medium that represents the corresponding digital file (sometimes referred to as "ripping" or generating printing code). For instance, a printer is considered stand-alone if an external device merely passes a digital photograph to the print and the printer contains the logic for processing and printing the digital photograph. The foregoing definitions are inclusive and open-ended. For example, a stand-alone printer may additionally be capable of receiving printing code from an external device. As a further example, a photoprinter may additionally be capable of processing and printing digital files other than digital photographs, such as text files, word processing files, HTM files, and the like.

The photoprinter 10 is operative to print digital photographs on printable media (e.g., paper, glossy film or photo paper, index cards, labels, envelopes, transparencies, coated paper, cloth, etc.). In one preferred embodiment, the photoprinter 10 works by transferring an ink (e.g., toner, dye, pigment, wax, carbon, etc.) onto a printable medium. For instance, the photoprinter 10 can employ conventional thermal ink jet technology, however, it is contemplated that the present invention can be adapted for use with other types of ink jet technologies, such as piezo inkjet. In addition, the present invention can be adapted for use with other printer technologies, such as electrophotography, dye diffusion, thermal transfer, and the like.

While the photoprinter 10 operates as a stand-alone printer, it can nevertheless communicate with a variety of external components, only a portion of which are illustrated in FIG. 1. In the present example, the photoprinter 10 can communicate to a computer 12 using any one of a variety of different communication links, such as parallel cables, serial cables, telephone lines, universal serial bus "USB", Firewire, IEEE-1394, Bluetooth, fiber optics, infrared "IR", radio frequency "RF", network interface cards (e.g., Ethernet, token ring, etc.), and the like. The computer 12 can be any conventional or special purpose computer, such as a desktop computer, a tower computer, a micro-computer, a mini-computer, server, workstation, palmtop computer, notebook computer, or the like. Through the communication link, the photoprinter 10 can receive digital photographs from the computer 12 for processing and printing. In one embodiment, the computer 12 is programmed to generate printing code (e.g., via locally loaded print drivers) and the photoprinter 10 is capable of receiving the externally processed printing code for direct printing. As such, the photoprinter 10 would have dual functionality: a stand-alone printer as well as a more conventional printer for receiving commands from an external device.

In the present example, the photoprinter 10 can also communicate with an external display 14 (e.g., a television, monitor, LCD, or the like) using an appropriate communication link. In such a configuration, the photoprinter 10 can generate and send appropriate signals to present a user interface to operate the photoprinter 10 or preview digital photographs on the display 14. The photoprinter 10 also can communicate with a digital camera 16 using an appropriate communication link. Typically, a digital camera 16 includes one or more lenses that focus light into an image on a light sensing electronic device, and stores the image as a digital photograph. In one embodiment, the photoprinter 10 can retrieve, process and print digital photographs stored in the camera 16.

The photoprinter 10 can also communicate with a computer readable medium 18, shown here as a floppy diskette. A computer readable medium stores information readable by a computer, such as programs, data files, etc. As one with ordinary skill in the art will readily appreciate, a computer readable medium can take a variety of forms, including magnetic storage (such as hard drives, floppy diskettes, tape, etc.), optical storage (such as laser disks, compact disks, digital video disks "DVD", etc.), electronic storage (such as random access memory "RAM", read only memory "ROM", programmable read only memory "PROM", flash memory, memory sticks, etc.), and the like. Some types of computer readable media, which are sometimes described as being non-volatile, can retain data in the absence of power so that the information is available when power is restored.

The photoprinter 10 preferably interfaces with the computer readable medium 18 using an internal or external drive. As used herein, the term "drive" is intended to mean a structure which is capable of interfacing with (e.g., reading from and/or writing to) a computer readable medium. Naturally, suitable drives will vary depending upon the specific computer readable medium 18 being employed. In one embodiment, the photoprinter includes first and second drives each adapted to receive a solid state flash memory card. The first and second drives are preferably both internal drives. Flash memory cards, due to their very small size and light weight, are a highly portable computer readable medium which are electrically rewritable and are non-volatile. In a further embodiment, the first and second drives are adapted to receive different types of flash memory cards, such as a NAND type of flash memory card (e.g., a SMART MEDIA card developed by Toshiba, Inc.) or a PCMCIA type of flash memory card (e.g., the COMPACTFLASH developed by SanDisk, Inc.).

Figure 2:
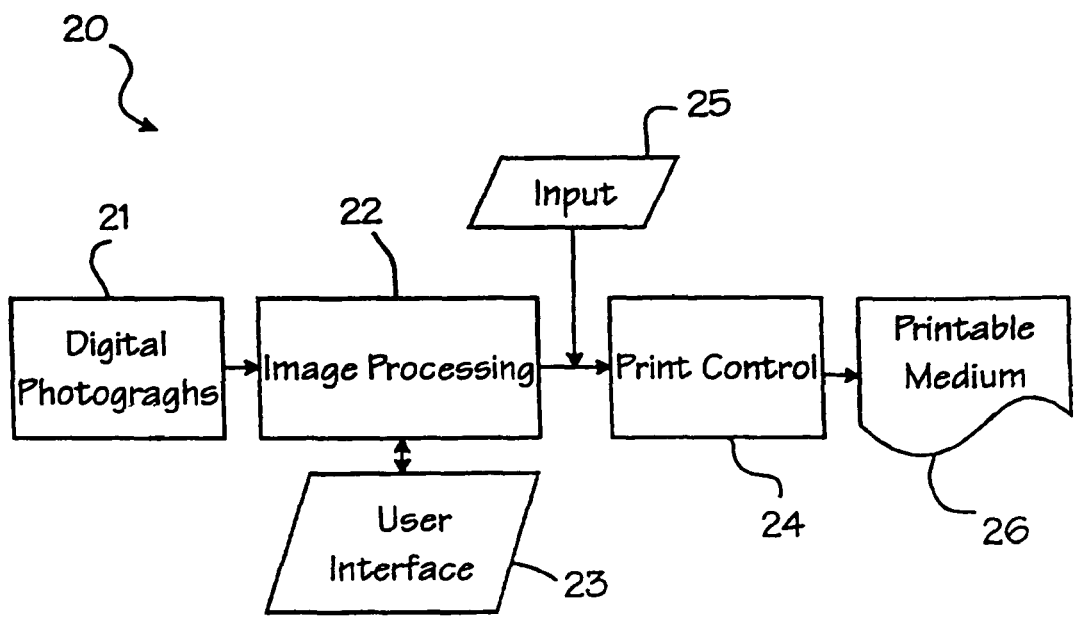
FIG. 2 depicts an operational block diagram for the photoprinter of FIG. 1.

FIG. 2 depicts an operational block diagram 20 for the photoprinter 10. One or more digital photographs 21 are input to the image processing block 22, located internal to the photoprinter 10. The digital photographs 21 can be received from a variety of different sources, whether internal to the photoprinter 10 or from an external source via a drive, communications link, or the like. Furthermore, the digital photographs 21 can take any one of a variety of different file formats, whether raster, vector, or other format (e.g., GIF, TIFF, PCX, JPEG, EXIF, CIFF, JFIF, etc.).

The image processing block 22 is responsible for calculating a pixel pattern to be printed on the printable medium 26 that represents the corresponding digital photographs 21, sometimes referred to in the art as generating printing code. The image processing block 22 may optionally enhance the digital photographs 21. For instance, photo enhancement software, such as the PICTURE IQ software by Digital Intelligence, may be incorporated into the image processing 22. Further, image processing 22 may optionally include a variety of different resources to modify the printed rendition of the digital photographs 21, such as the addition of text, frames, templates, scaling, etc. Enhancements or resources may be implemented before and/or after the digital photographs 21 are converted to printing code. A user interface 23 is provided to allow a user to interact with and/or direct the image processing block 22 (e.g., controlling the enhancements and/or resources). The user interface 23 may be integral to the photoprinter 10 or located on an external component. Preferably, however, the photoprinter 10 includes an LCD display with one or more buttons or other input devices. Optionally, the user interface 23 may take the form of a series of instructions accompanying the digital photographs 21, such as a digital print order format "DPOF".

The print code generated during image processing 22 is passed to the print control 24. In the cases where printing code is generated from an external source (e.g., computer 12), such printing code can be input 25 directly to the print control 24, thus bypassing the image processing block 22. The print control 24 is responsible for directing the physical transference of the pixel pattern by the printing to the printable medium 26. The photoprinter 10 is preferably in the form of a thermal inkjet printer having one or more conventional thermal ink jet print heads. During printing, the print control 24 directs one or more motors to move the printable medium 26 longitudinally relative to the photoprinter 10 so that it is properly positioned for deposition of an ink pattern or swath. Once the printable medium 26 is in position, the print control 24 directs the print head to move along a conventional print head carriage in a direction transverse to the longitudinal direction while firing droplets of ink onto the surface of the printable medium 26. The print head may make one or more of these transverse passes to complete printing for the swath. After the swath is complete, the printable medium's 26 position is adjusted longitudinally for the printing of the next swath.

The user interface of a photoprinter is important for customer satisfaction since it must advise the user of the images selected for printing and the various printing, enhancement, and formatting options that can be selected. Current photoprinters do not include graphical displays for previewing images prior to printing. Such a display would be a desirable addition to a photoprinter, but the cost is high. A color display has become a market requirement for digital cameras. If the same display (and other resources) on the digital camera can be accessed by the photoprinter appliance, the attendant display costs could be avoided resulting in an improved user interface having a lower cost design.

Figure 3:
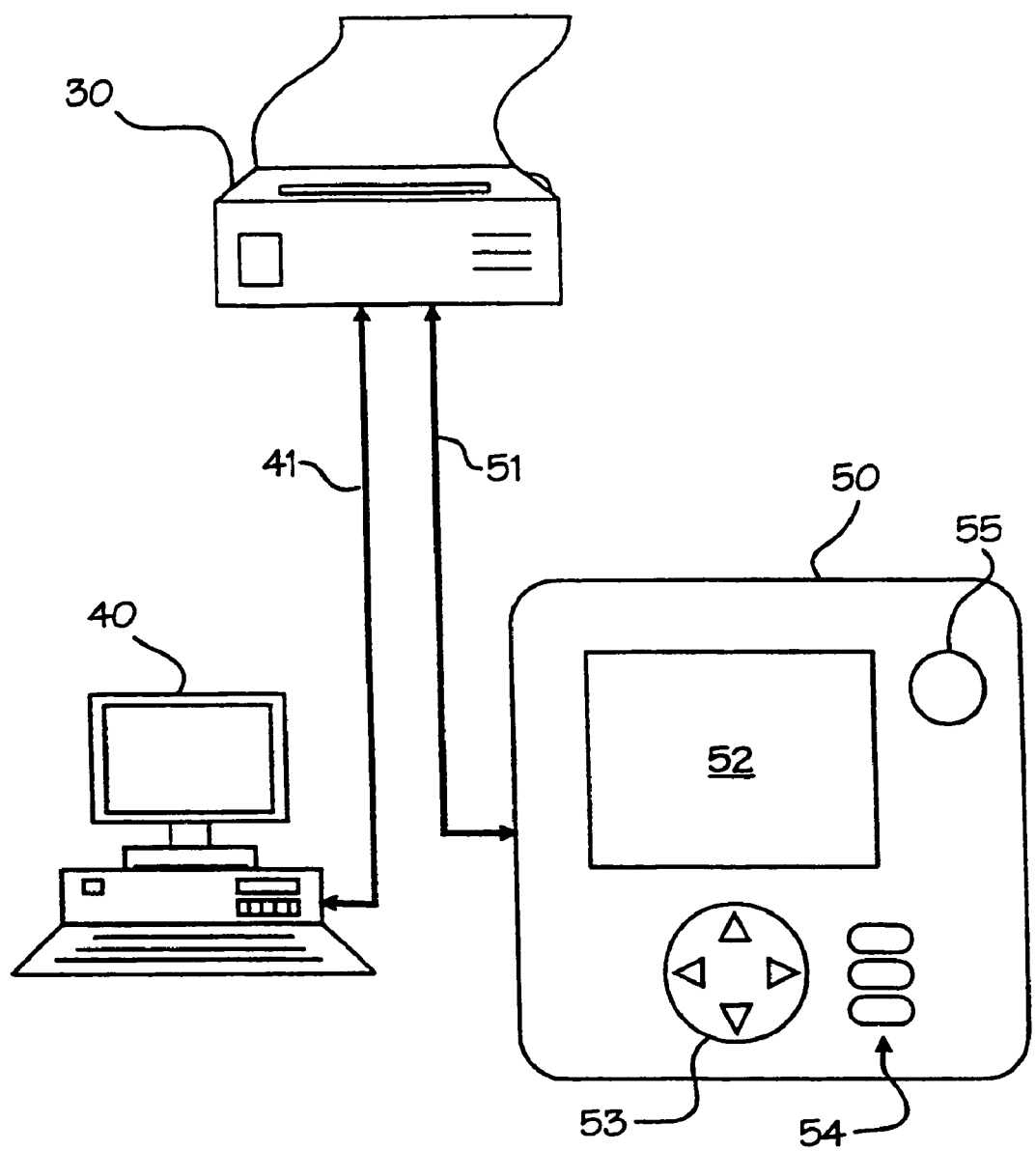
FIG. 3 depicts a host/client photoprinter configuration.

FIG. 3 depicts one embodiment where the photoprinter 30 is the host device for the digital camera 50, which is a client under the direction of the photoprinter 30. The photoprinter 30 communicates with the digital camera 50 via the communication link 51. While the components and configurations of digital cameras vary, for the purposes of illustration the digital camera 50, shown here from the back side, includes a display 52, such as a 240×320 color LCD, for presenting photographs and options to the user. The digital camera 50 further includes a variety of selection mechanisms. In this example, a directional toggle pad 53 allows a user to interact with items presented on the display 52, depending on how the camera is programmed. For instance, using the pad 53 the user can traverse menu or icon options presented on the display 52. The digital camera 50 also includes other buttons 54 as selections mechanisms, which may be used independently or in cooperation with the display 52. A shutter release button 55 opens a shutter allowing light to be focused into an image on a light sensing electronic device, which image is then stored as a digital photograph.

The photoprinter 30 is a host device controlling the client digital camera 50 (sometimes referred to as a host/client relationship). As such, the photoprinter 30 direct the user interface and images pressed on the display 52. Optionally, the results from user inputs via the selection mechanism such as the pad 53 or buttons 54, will be directed by the photoprinter 30. Based on instructions passed from the photoprinter 30 to the digital camera 50, a user may control the operation of the photoprinter 30. In other words, the display 52 and selection mechanisms on the digital camera 50 become the user interface for the photoprinter 30. By accessing and controlling the resources (color display, memory, processor, etc.) of the digital camera 50, these functions do not need to be repeated in the photoprinter, thus enabling a lower cost design. It is further contemplated that the photoprinter 30 can be a host device controlling peripherals other than digital cameras, such a scanners, drives, monitors, etc.

While the forgoing host/client may be established where the digital camera 50 being specifically designed to cooperate with the photoprinter 30, a more generic configuration is preferred. One such preferred configuration takes the form of the digital camera 50 having an open operating system, such as Digita™ that allows the digital camera 50 to be programmed to perform different tasks or to redefine the user interface.

Digita™ is an "operating environment" designed by Flashpoint Technology, Inc. specifically for use in digital imaging products, and currently found in digital cameras such as the Kodak DC-220, DC-260, DC-265, DC-290, and Minolta EX-1500. Among other things, Digita™ provides cameras with a menu-driven graphical user interface (GUI), manages the host interface by which images are downloaded to a host from the camera, enables developers to write scripts to simplify complex tasks and automate repetitive routines, enables developers to write applications to add all new features and functions for the camera, and allows customizable camera preferences and software upgradability.

Preferably, the photoprinter still operates (although perhaps at a reduced function or reduced performance) without the digital camera 50 or with an unsupported digital camera. However, with a supported digital camera, additional function and performance may be achieved. For example, image selection would be more convenient and accurate if the active image was previewed on the display 52 of the digital camera 50. Selection of digital photographs can be performed with selection mechanisms on the photoprinter 30 or the digital camera 50, with selected digital photographs being presented on the display 52. Further, other functions, such as image cropping and enhancement would be more convenient if they could be previewed on the display 52 prior to printing. Without a display for allowing image previewing, the user must wait for the image, whether modified or not, to be printed before discovering whether it was what the user desires. This configuration would save the user time and money by allowing full color preview of images prior to printing. In addition, digital photographs could be manipulated, much the same as today's personal computers with their digital editing software, through embedded digital photograph enhancement software on the printer and via the digital camera's user inter instead of using a personal computer keyboard and mouse for manipulating the photographs. This allows for stand-alone digital photograph enhancement while utilizing the digital camera's display 52 for previewing the changes, rather than having to rely on the user having a more expensive personal computer to implement this task. Furthermore, a photoprinter 30 could utilize the microprocessor and memory on the digital camera 50 to preform all or a portion of the image processing function, either before or after passing a digital photograph to the photoprinter 30, thus increasing the photoprinter 30 performance.

The photoprinter 30 also communicates with the computer 40 via the communications link 41. In this configuration, the computer 40 is a host device controlling the photoprinter 30. Accordingly, the photoprinter 30 has dual roles: a client to the computer 40 and a host to the digital camera 50. The dual roles of the photoprinter are independent of one another. Accordingly, the photoprinter 30 can be a host without being a client, can be a client without being a host, and can be both a host and client at the same time. Nevertheless, the photoprinter 30 retains the functionality of being a stand-alone printer.

While the communication links 41, 51 may take any form and do not need to be identical, the communication links 41, 51 are both preferably USB connections. USB offers a variety of advantages, including a physically smaller connector size and significantly ester data transfer rate compared to parallel or serial cable connectors. However, a limitation of USB is that it is not a peer-to-peer network. According to the current USB specification (i.e., USB Specification, Revision 1.1), a USB configuration can only have one USB host, which is a computer. All other attached devices are considered USB devices or peripherals, which cannot initiate requests. Two major divisions of USB device classes exist: hubs and functions. USB hubs have the ability to provide additional USB attachment points, and USB functions provide additional capabilities to the USB host. According to the present definition of USB, only a USB computer can initiate requests.

In one embodiment, the photoprinter 30 takes the role of a USB host and is able to initiate requests to attached peripherals, such as the digital camera 50, in the same manner that a computer can initiate requests. In addition, when connected upstream to a USB host computer 40 the photoprinter 30 can be a USB host and attached to other USB devices downstream while co-existing with the USB host computer 40. When connected only to the USB host computer 40, with no USB devices attached downstream from the photoprinter 30, the photoprinter 30 functions as a USB device.

The following describes one preferred configuration for the photoprinter 30 to have dual roles of being a USB host and USB device. If the USB host computer 40 initiates a request to the photoprinter 30 at the same time the photoprinter 30 is functioning as a USB host to another USB device (e.g. digital camera 50), the photoprinter 30 responds to the request that it is temporarily unable to accept or return data. For instance, the photoprinter 30 could respond to the request with a NAK (No Acknowledge Packet), until it is finished functioning as a USB host. Once the photoprinter 30 is no longer functioning as a USB host, it is then ready to accept data from the USB host computer 40. If the photoprinter 30 is attached simultaneously to a USB host computer 40 and USB device, the photoprinter 30 preferably monitors the traffic over the USB to ensure that the USB host computer 40 has not initiated any requests prior to initiating the photoprinter's 30 own request to a downstream USB device.

Figure 4:
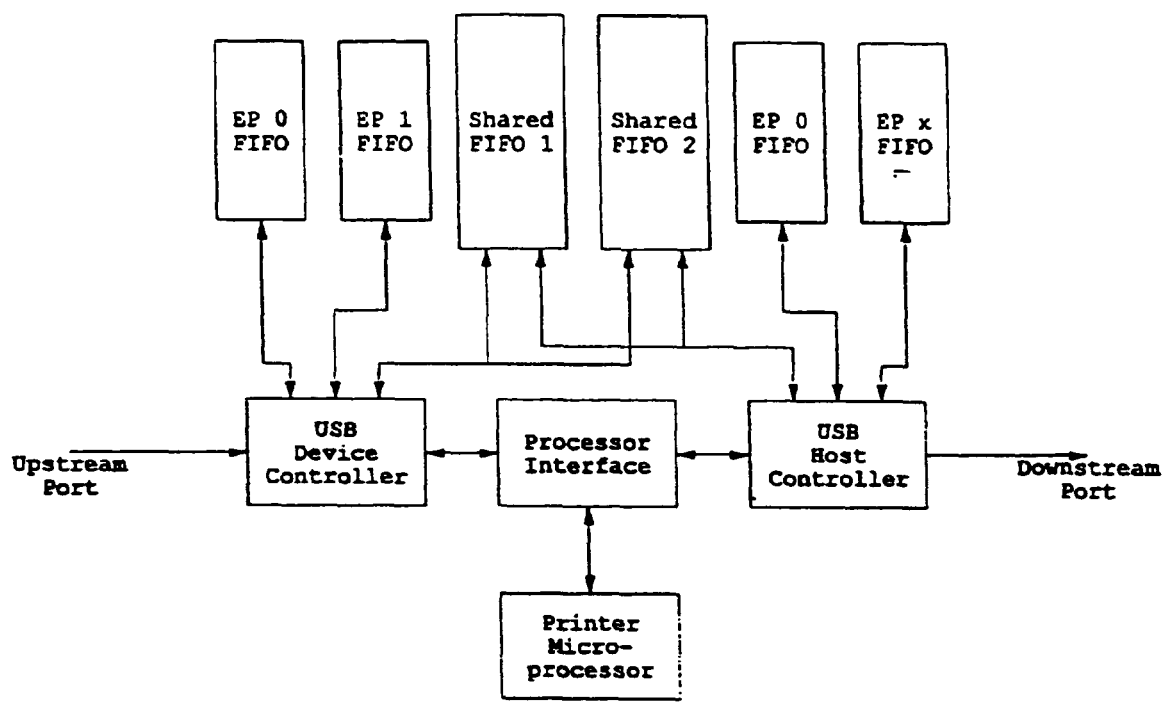
FIG. 4 illustrates a block diagram of a USB host/device controller embodiment.

A block diagram of one possible implementation to send and receive data is shown in FIG. 4. The USB device controller and USB host controller are similar to standard controllers available from Sand Microelectronics, Inventra, and others. EP 0 is the control endpoint, EP 1 is the bulk-out endpoint, and the EP x FIFO is used for bulk transfers to any other endpoint (the endpoint number x is determined by the downstream device). Preferably, the USB host controller is a minimal implementation in that it only implements the features of a USB host that are necessary to communicate with the downstream device. It does not implement, for example, isochronous or interrupt transfers. The processor interface contains registers to control, configure, and test the USB device and host controllers. The dual, shared FIFOs are used by both the device and host controllers when the printer is transferring data between a host computer and a downstream device.

The use of two shared FIFOs allow one FIFO to receive data while data is being read from the other FIFO. For example, if data is being transferred from the digital camera 50 on the downstream port to the host computer 40, FIFO 1 can receive the first packet of data. The USB device controller can then send the data in FIFO 1 to the host while the USB host controller writes the next packet of data to FIFO 2. The host computer 40 will only see the photoprinter 30 on its USB. The photoprinter 30 presents itself as a compound device, allowing the host computer 40 to use the photoprinter 30 and downstream USB devices that is supported by the photoprinter 30. The photoprinter 30 can communicate direly with a supported USB device on the downstream port without using any of the bandwidth on the upstream USB. If the photoprinter 30 sees that the host computer 40 has initiated a request that is not intended for the photoprinter 30, the photoprinter 30 passes this information through to the USB device attached downstream from it.

Figure 5:
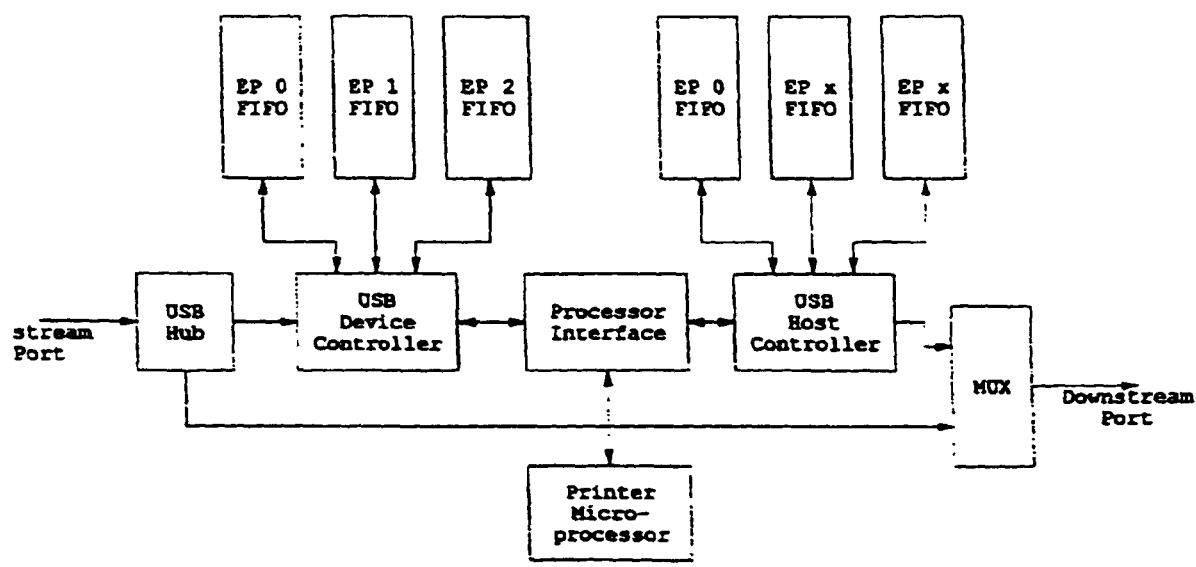
FIG. 5 illustrates a block diagram of a USB hub/device/host embodiment.

An alternate implementation for sending and receiving data, shown in FIG. 5, uses a standard USB hub controller. When the photoprinter 30 is plugged into the host computer 40, the downstream-port multiplexer is switched to the USB hub. The USB host then sees on its USB both the photoprinter 30 and any USB device that is plugged into the downstream USB device. In stand-alone mode, the multiplexer is switched to the USB host controller. The photoprinter 30 is then in control of USB devices attached to the downstream port. This implementation requires additional hardware, but allows any downstream USB device to be used when the photoprinter 30 is connected to the host computer 40.

Accordingly, digital photographs can be transferred from a digital camera over the USB and printed without the use of a personal computer. Transferring the digital photographs to be printed via USB eliminates the added cost associated with having different style drives (such as compact flash drive, SmartMedia drive, floppy disk drive, ZIP disk drive, SuperDisk drive, and the like) on the stand-alone printer. One advantage of using USB connectors and cabling is their small size and industry wide availability, which also makes them an inexpensive solution. Another advantage is the simultaneous attachment of the USB host printer to a USB host computer and to a USB device, such as a digital camera. Accordingly, a stand-alone prior may be a USB host or a USB passthrough device. Other implementations include attaching a scanner via USB to the USB host prier, which would allow color or black and white copies to be made via the printer's control panel. Further, one could attach a video camera, television, VCR or the like to the USB host printer, and with a video capture software embedded into the printer, one could print directly from these devices by utilizing the printer's control panel.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

We claim:

1. A photoprinter configuration, comprising:
    a) a digital camera comprising a viewable display and one or more selection mechanisms; and
    b) a photoprinter capable of processing and printing digital files independent of an external host device and connected to the digital camera via a communication link, the photoprinter being operative to control the viewable display of the digital camera;
    wherein processing the digital files comprises calculating a pixel pattern to be printed on a printable medium.

2. The photoprinter of claim 1, wherein the photoprinter is further operative to direct the results from a user's inputs to the selection mechanisms.

3. The photoprinter of claim 1, further comprising means for controlling the digital camera by the photoprinter.

4. A method for controlling a digital camera, comprising the steps of:
    a) obtaining a photoprinter capable of processing and printing digital files independent of an external host device and operative to print digital photographs onto printable media, wherein processing the digital files comprises calculating a pixel pattern to be printed on the printable media;
    b) obtaining a digital camera comprising a viewable display and one or more selection mechanisms;
    c) connecting the digital camera to the photoprinter via a communication link;

d) transmitting a plurality of instructions from the photoprinter to the digital camera via the communication link; and e) controlling the digital camera by the photoprinter in accordance with the plurality of instructions;

wherein at least a portion of the instructions are operative to control the viewable display of the digital camera.

5. The method of claim 4, wherein the instructions are operative to preview digital photographs on the viewable display.

6. The method of claim 4, wherein the instructions are operative to present a user interface on the viewable display.

7. The method of claim 4, wherein the instructions are operative to direct an operation of the photoprinter based on input to the selection mechanisms.

8. The method of claim 7, wherein the instructions are further operative to select digital photographs for printing based on input to the selection mechanisms.

9. The method of claim 7, wherein the instructions are further operative to modify a printed rendition of digital photographs based on input to the selection mechanisms.

* * * * *